No. 768,872. PATENTED AUG. 30, 1904.
H. BADEN & W. GLÜSS.
MACHINE FOR MOLDING CEMENT ROOFING TILES.
APPLICATION FILED DEC. 12, 1903.
NO MODEL. 2 SHEETS—SHEET 1.
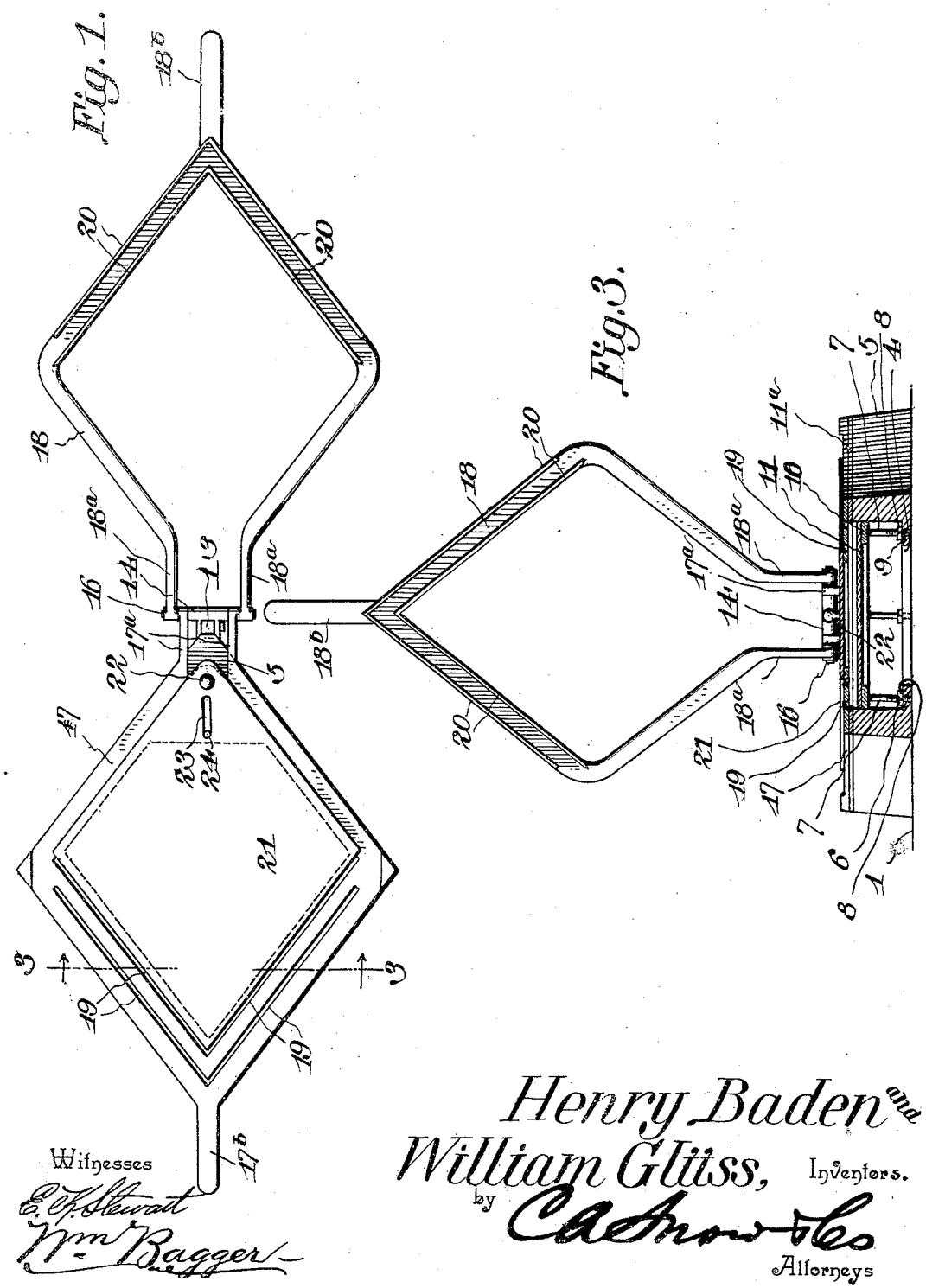
Henry Baden and William Glüss, Inventors.

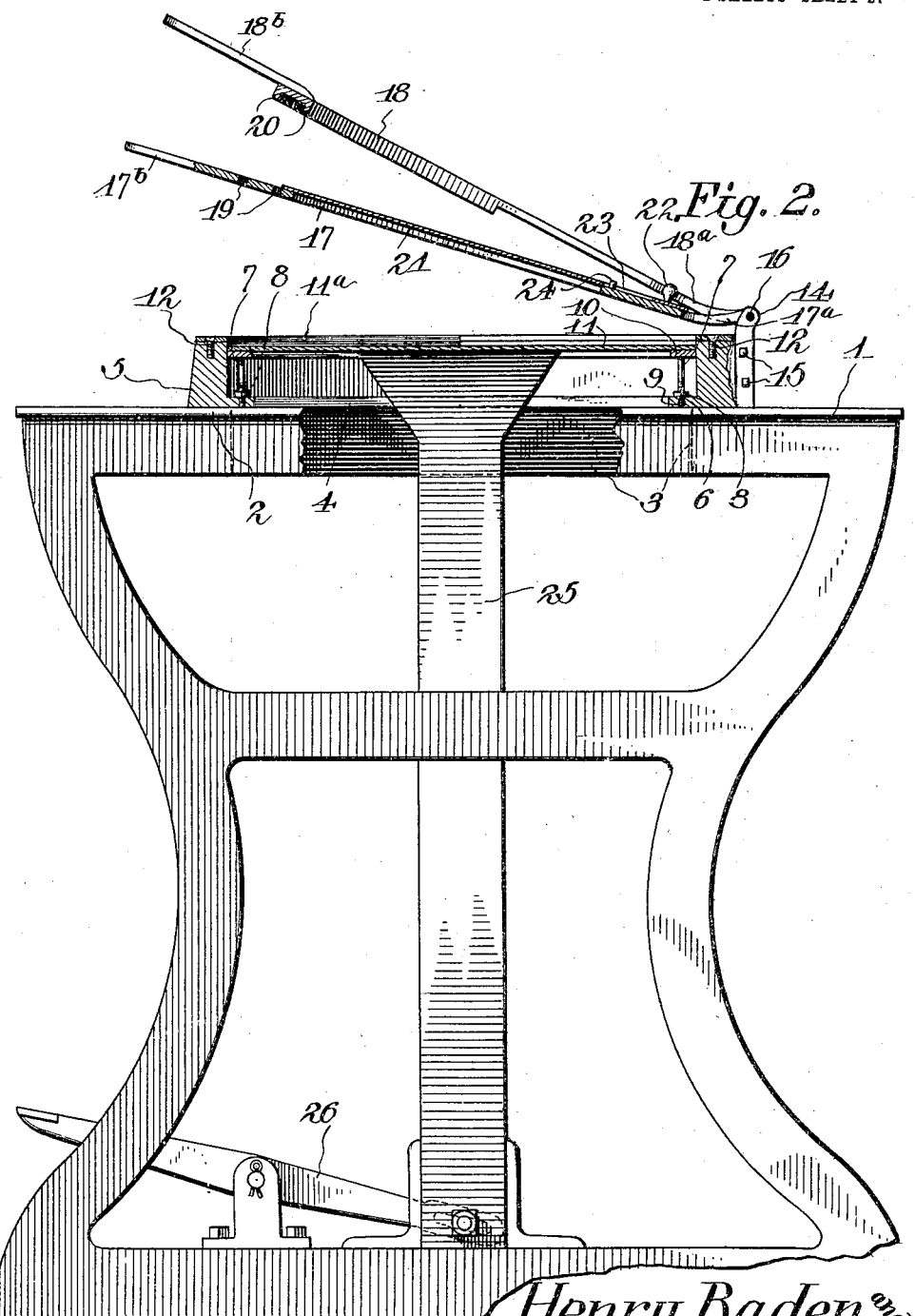

No. 768,872. Patented August 30, 1904.

UNITED STATES PATENT OFFICE.

HENRY BADEN AND WILLIAM GLÜSS, OF HAMLER, OHIO, ASSIGNORS TO AMERICAN CEMENT ROOFING CO., INCORPORATED, OF HAMLER, OHIO.

MACHINE FOR MOLDING CEMENT ROOFING-TILES.

SPECIFICATION forming part of Letters Patent No. 768,872, dated August 30, 1904.

Application filed December 12, 1903. Serial No. 184,938. (No model.)

*To all whom it may concern:*

Be it known that we, HENRY BADEN and WILLIAM GLÜSS, citizens of the United States, residing at Hamler, in the county of Henry and State of Ohio, have invented a new and useful Machine for Molding Cement Roofing-Tiles, of which the following is a specification.

This invention relates to machines for molding plastic material, such as cement, and it has especial reference to a machine for molding and manufacturing cement roofing plates or shingles.

The object of the invention is to produce a machine of this class which shall be simple in construction and easily operated; and with these and other ends in view the invention consists in the improved construction, arrangement, and combination of parts, which will be hereinafter fully described, and particularly pointed out in the claim.

In the drawings hereto annexed has been shown a simple and preferred form of embodiment of the invention, it being understood that changes may be made as to the size, proportion, and exact manner of assemblage of the component parts of the device without departing from the spirit or sacrificing the utility of the invention.

In said drawings, Figure 1 is a plan view of a machine constructed in accordance with the principles of the invention, the upper lid or frame being swung back, so as to expose the subjacent construction. Fig. 2 is a longitudinal sectional view showing both lids partly raised. Fig. 3 is a transverse sectional view taken on the line 3 3 in Fig. 1.

Corresponding parts in the several figures are indicated by similar numerals of reference.

The machine which is the subject of this invention is preferably arranged for operation upon a table 1, the top of which, 2, has an opening 3, which coincides with the central opening 4 in the mold-frame 5. The latter may be made of any desired size and outline for the article which is to be molded. In the accompanying drawings a rhomboidal frame has thus been shown. This frame is provided at its lower edge with an inwardly-extending flange 6, supporting a plurality of bolts 7, which are vertically adjustable by means of nuts 8, resting upon said flange, which latter is provided with openings 9 for the downward passage of said bolts. The latter serve as adjustable supports for the vertically-movable frame 10, which is fitted within the mold-frame 5 to slide vertically within the latter, and said frame 10 serves as a support for the false bottom 11, the upper side of which is shaped to correspond with the under side of the article to be molded. Thus the said false-bottom plate may be perfectly flat upon its upper side or it may be corrugated, according to the nature of the article to be molded.

The upper edge of the mold-frame 5 supports a detachable frame $11^a$, which exactly corresponds in shape and outline to the upper edge of the mold-frame, with which it may be detachably connected by screws 12 or other suitable means which will admit of its being readily detached whenever it has been worn to such an extent as to render it useless. The rear end of the mold-frame is extended to form brackets 13, to which is secured a hinge member 14, which is preferably adjusted upon the bracket 13 by means of set-screws 15, which serve to secure it in position. The hinge member 14 has a transverse pintle 16, upon which the lower and upper movable frames 17 and 18 are hingedly mounted by brackets $17^a$ and $18^a$, extending rearwardly from said frames, said lower and upper frames being provided with forwardly-extending finger-pieces $17^b$ and $18^b$. The lower frame 17, which when closed down upon the mold rests upon the upper side of the detachable wear-frame $11^a$, is provided with slots 19, and the upper frame 18 is provided with downwardly-extending flanges 20, exactly coinciding with the said slots, into which when the machine is closed they will precisely fit. Upon the upper side of the lower frame 17 is mounted a thin movable sliding plate or scraper 21, having a handle 22, whereby it may be conveniently operated, and also provided with a slot 23, engaging a guide-lug 24 upon the frame 17 to limit the movement of the said sliding plate.

For the purpose of ejecting the bottom plate of the mold after an article has been finished I provide a plunger 25, suitably guided in the standard of the table 1 and operable by a foot-lever 26.

This machine is constructed expressly for the purpose of producing cement roofing-tiles which are to be provided with V-shaped projecting flanges. It is for the production of these flanges that the movable frames 17 and 18 are provided, the frame 17 being provided with the slots 19, which may be filled with cement for the production of said flanges, while the frame 18 is provided with flanges 20 for the purpose of enabling the slotted plate 17 to be raised without injury to the cement flanges, which are expelled from the slots 19 by means of the flanges 20 upon the frame 18. The plate or scraper 21 is for the purpose of removing any excess of cement which may remain after the slots 19 have been filled or packed.

It is extremely important that the upper surface or edge of the mold-frame shall at all times be perfectly smooth and level, and inasmuch as this part is peculiarly exposed to wear the detachable wear-frame 11ª forms an important part of the device, inasmuch as it may be readily detached when it becomes worn, thus permitting a new frame to be substituted in its place.

In operation after swinging the frames 17 and 18 to a raised position the material which is to be molded is packed in the space bounded by the false-bottom plate 11 and the upper edge of the detachable wear-plate 11ª, where it is smoothed and flattened in the usual manner. The lower frame 17 is now lowered upon the mold, and the slots 19 therein are carefully packed with plastic material such as is being used. The slide 21 is now operated to cut off the surplus material from the upper side of the slotted frame. Next by moving the top plate 18 in a downward direction until the flanges 20 coincide with the slots 19 in the lower plate and then raising the latter by means of the handle of the finger-piece 17ᵇ the said lower frame will be raised clear of the molded article, after which both frames are thrown back clear of the mold. The ejector 25 may then be raised by the foot-lever 26 until the false bottom 11 is lifted clear of the mold, when it, with the molded article supported thereon, may be readily removed and set aside to dry.

It is obvious that by properly adjusting the nuts 8 upon the bolts 7 the latter may be raised or lowered, thus raising or lowering the frame which supports the bottom plate of the mold. The thickness of the article produced may be thereby regulated, as will be readily understood.

Having thus described our invention, we claim—

In a device of the class described, a mold-frame having an inwardly-extending flange provided with perforations, bolts movable in said perforations, nuts supporting said bolts upon the flange of the mold, a frame slidable within the mold-frame, a bottom plate supported upon said frame, hinge-brackets supported adjustably upon a rearward extension of the mold-frame and a lower and an upper frame having bracket-arms connected hingedly with the pintle of the hinge-bracket, said lower frame being provided with slots and said upper frame being provided with flanges coinciding with said slots, forwardly-extending finger-pieces upon the said frames, a slide, for removing surplus material, supported upon the lower frame, a handle upon said slide, means for limiting the movement of the latter, and means for ejecting the bottom plate of the mold when the lower and upper frames are in a raised position.

In testimony that we claim the foregoing as our own we have hereto affixed our signatures in the presence of two witnesses.

HENRY BADEN.
WM. GLÜSS.

Witnesses:
A. M. JACKMAN,
CHAS. KERR.